(12) United States Patent
Øllgaard

(10) Patent No.: US 9,080,306 B2
(45) Date of Patent: Jul. 14, 2015

(54) METHOD OF LAYING A FOUNDATION OF A TOWER CONSTRUCTION

(75) Inventor: Børge Øllgaard, Esbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/636,283

(22) PCT Filed: Mar. 24, 2010

(86) PCT No.: PCT/EP2010/053832
§ 371 (c)(1),
(2), (4) Date: Dec. 4, 2012

(87) PCT Pub. No.: WO2011/116817
PCT Pub. Date: Sep. 29, 2011

(65) Prior Publication Data
US 2013/0068924 A1    Mar. 21, 2013

(51) Int. Cl.
*E04G 21/12* (2006.01)
*E02D 27/42* (2006.01)
*E04G 21/18* (2006.01)

(52) U.S. Cl.
CPC ............... *E02D 27/42* (2013.01); *E04G 21/12* (2013.01); *E04G 21/185* (2013.01)

(58) Field of Classification Search
CPC ....... E04G 21/12; E04G 21/185; E02D 27/08; E02D 27/42; E02D 27/425; E04H 12/00
USPC ............ 52/741.14, 741.15, 295; 33/518, 613, 33/645
See application file for complete search history.

(56) References Cited

U.S. PATENT DOCUMENTS

| | | | | |
|---|---|---|---|---|
| 3,469,817 A | * | 9/1969 | Bowden et al. | 249/183 |
| 5,826,387 A | * | 10/1998 | Henderson et al. | 52/295 |
| 6,250,613 B1 | * | 6/2001 | Koeske et al. | 267/66 |
| 6,672,023 B2 | * | 1/2004 | Henderson | 52/296 |
| 7,155,875 B2 | * | 1/2007 | Henderson | 52/741.15 |
| 7,533,505 B2 | * | 5/2009 | Henderson | 52/292 |
| 7,707,797 B2 | * | 5/2010 | Henderson | 52/745.17 |
| 7,805,895 B2 | * | 10/2010 | Kristensen | 52/169.9 |
| 8,037,646 B2 | * | 10/2011 | Wobben | 52/126.3 |
| 8,051,627 B2 | * | 11/2011 | Schiffer et al. | 52/854 |
| 2007/0251187 A1 | * | 11/2007 | Schiffer et al. | 52/741.14 |
| 2009/0044482 A1 | | 2/2009 | Tooman | |
| 2013/0101359 A1 | * | 4/2013 | Maier | 405/224 |

FOREIGN PATENT DOCUMENTS

| | | | | |
|---|---|---|---|---|
| DE | 10045735 A1 | 3/2002 | | |
| EP | 2395155 | * 12/2011 | ............... | E02D 5/64 |
| JP | 11303097 A | 11/1999 | | |

OTHER PUBLICATIONS

International Searching Authority, Search Report issued in corresponding PCT/EP2010/053832 dated Aug. 30, 2011, 4 pages.

* cited by examiner

*Primary Examiner* — Michael Safavi
(74) *Attorney, Agent, or Firm* — Wood, Herron & Evans, LLP

(57) ABSTRACT

The invention provides a method of laying a foundation of a tower construction which comprises a base flange. The method comprises the steps of: providing a number of anchor rods, providing a ring-shaped formwork, arranging the anchor rods in a pit in the ground, arranging the formwork in engagement with the anchor rods so as to be supported thereby, casting a concrete element, casting a second casting layer in a groove in the concrete element, the groove being provided by the formwork, lowering the base flange onto the second casting layer, and fixing the base flange to the concrete element.

18 Claims, 6 Drawing Sheets

METHOD OF LAYING A FOUNDATION OF A TOWER CONSTRUCTION

FIELD OF THE INVENTION

The present invention relates to a method of laying a foundation of a tower construction and to a formwork for use when laying a foundation.

BACKGROUND OF THE INVENTION

When laying a foundation of a tower construction such as a wind turbine, a reinforced concrete element is often cast and subsequently, the turbine tower is positioned on the concrete element and fixed thereto. A simple way of fixing the tower to the concrete element is to anchor substantially vertical anchor rods in the concrete element, and attach these to a flange being attached to the tower wall.

U.S. Pat. No. 5,586,417 discloses an example of such a tower construction. The foundation is formed within a ground pit and externally and internally back filled. The lower end of the foundation has a circumferential ring fully embedded therein. Sets of inner and outer circumferentially spaced bolts have lower ends anchored to the ring, upper ends projecting up outwardly of the top of the foundation, and mid-portions free of connection with the cementitious material of which the foundation is constructed. The base flange of a tubular tower is positioned downwardly upon the upper end of the foundation with the upper ends of the inner and outer sets of bolts projecting upwardly through holes provided in the base flange. Nuts are threaded downwardly upon the upper ends of the bolts and against the base flange. The nuts are highly torqued in order to place the bolts in heavy tension and to thus place substantially the entire length of the cylindrical foundation in heavy axial compression.

A high strength grout may be used directly under the base flange of the tower to support the weight of the tower. Such a grout may not be desirable for the entire foundation, e.g. due to material costs. Therefore the grout is moulded on a base of concrete with a relatively lower strength.

It is important to provide a solid interface between the high strength grout and the relatively lower strength concrete, but use of the two different types of material increases moulding costs and the time consumption associated therewith.

SUMMARY OF THE INVENTION

It is an object of the present invention to provide an improved method of laying a foundation of a tower construction and to provide a formwork for use when laying a foundation for a tower construction.

Thus, in a first aspect, the invention provides a method of laying a foundation of a tower construction which comprises a base flange, the method comprising the steps of:
  providing a number of anchor rods,
  providing a ring-shaped formwork,
  arranging the anchor rods in a pit in the ground,
  arranging the formwork in engagement with the anchor rods so as to be supported thereby,
  casting a concrete element, wherein the formwork provides a groove in the concrete element,
  casting a second casting layer in the groove in the concrete element,
  lowering the base flange onto the second casting layer, and
  fixing the base flange to the concrete element.

The tower construction may comprise traditionally tapered round tower sections mounted on top of each other. Each tower section may be made of a steel plate rolled into shape and assembled by welding of opposite free ends thereby constituting a closed ring. Alternatively, each section may be formed by a number of plates being assembled to form a tower section. The tower may be also be made without using tower sections, e.g. the tower may be assembled by a number of plates having the height of the final tower. Other types of towers may also be used, these towers having a tower wall extending upwardly from a base flange.

The anchor rods may be elongated high strength steel rods being substantially vertically arranged in the pit. They may be spaced about the centre of the concrete element. When arranging the anchor rods in the pit, an anchor ring may have been positioned above the bottom of the pit. The anchor ring may be a steel flange comprising a plurality of through holes which enable connection of the anchor rods to the anchor ring, thus the anchor ring may be connected to a lower end of the anchor rods. The lower part of the anchor rods may be threaded and the connection of the anchor rods to the anchor ring may be secured by attaching a nut to each of the anchor rods below the anchor ring. When casting the concrete element, an upper section of the anchor rods may extend through the upper surface of the concrete element, i.e. through an upper mounting plane of the concrete element.

In one embodiment, the anchor rods are spaced in pairs, side-by-side forming two rings about the centre of the concrete element, the inner ring of the anchor rods having a slightly shorter diameter than the outer ring of the anchor rods. In this embodiment, the anchor ring comprises two sets of through holes spaced about the centre of the anchor ring, these through holes forming two rings. Another embodiment comprises four sets of anchor rods spaced side-by-side forming four rings about the centre of the concrete element, the anchor ring comprising a number of through holes which equals the number of anchor rods. Alternatively, another number of anchor rods may be applied allowing for another configuration of the anchor rods and the anchor ring. In a simple embodiment, the anchor rods may thus form only one ring about the centre of the concrete element.

The anchor rods may comprise a surface treatment which allows for tensioning the anchor rods with substantially no frictional forces affecting the concrete element. The surface treatment may be in the form of a coating or a casing. As an example, the anchor rods may be covered with hollow tubes of e.g. plastic, wrapped in plastic tape or coated with a suitable lubrication allowing the anchor rods to stretch under tension essentially without interacting with the concrete element.

In order to fix the tower to the concrete element, the base flange of the tower may comprise a plurality of through holes. Thus when positioning a tower, the anchor rods may extend through these holes. In one embodiment, the inner ring of the anchor rods extends through holes in the base flange and into an inner space of the tower, whereas the outer ring of the anchor rods extends through holes in the base flange and into a space outside the tower. When one ring of the anchor rods extends in the inner space of the tower and the other ring extends in the space outside the tower, torque resulting from the tower on the concrete element can be reduced.

When the anchor rods are arranged in the pit, the ring-shaped formwork is arranged in engagement with the anchor rods so as to be supported thereby. By providing a ring-shaped formwork, arrangement of the formwork in engagement with the anchor rods may be facilitated.

The term 'formwork' is in this connection understood to include a boarding, sheeting, or similar structure which is arranged to retain freshly placed and compacted concrete until it has gained sufficient strength to be self-supporting, e.g. as a temporary measure. The appearance of the finished concrete depends on the face texture and stiffness of the formwork.

The size of the ring-shaped formwork depends of the size of the tower construction. The diameter of the formwork may e.g. be in the range of 2.500-10.000 mm.

By arranging the formwork in engagement with the anchor rods, the formwork is attached to the anchor rods so that the anchor rods support/carry the formwork. If desired, however, the formwork and at least some of the anchor rods may comprise separate fixing structures adapted to cooperate with each other and further support the formwork. The fixing structures may comprise nuts or similar structures adapted to cooperate with e.g. a threaded portion of the anchor rods. Alternatively, the formwork may be arranged in engagement with the anchor rods by use of frictional forces such that separate fixing structures are not required. Other ways of arranging the formwork in engagement with the anchor rods may also be applied.

The engagement between the formwork and the anchor rods may allow for height adjustment of the formwork when arranging the formwork, so that the position of the formwork relative to the length of the anchor rods may be adjusted during and/or after arranging the formwork. It may thus be possible to adjust the position of the formwork relative to the bottom of the pit. If the formwork is arranged in engagement with the anchor rods by use of frictional forces, height adjustment may be easily and quickly carried out.

After having arranged the anchor rods and the formwork, the concrete element can be cast in the pit in the ground. To this end, a first casting layer is cast within the pit and around the formwork to form the concrete element. The anchor rods may thus act as a reinforcement of the concrete element. Further reinforcement may however also be provided.

The formwork provides a groove in the concrete element, in which groove the second casting layer can be cast. The formwork may be shaped to ensure the correct shape of the groove, thus facilitating the desired construction.

In one embodiment, the formwork is removed before casting the second casting layer. In this case, the outer shape of the formwork may correspond to the shape of the finished groove, as the formwork may restrain the liquid concrete until it has gained sufficient strength to be self-supporting. When removing the formwork, the groove may be ready for the second casting layer, i.e. the high strength grout.

When lowering the base flange of the tower onto the concrete element, the concrete element is exposed to a pressure. Therefore, the second casting layer may be provided in order to distribute the pressure to the concrete element.

The second casting layer may be cast before fixing the base flange to the concrete element, thus allowing for an even distribution of the pressure to which the concrete element is exposed, when fixing the base flange.

The step of fixing the base flange to the concrete element may further comprise a step of applying tension on the anchor rods. The base flange may comprise a plurality of through holes, through which holes the anchor rods may extend. The upper part of the anchor rods may be threaded allowing for attachment of a nut thereto. Subsequent to lowering the base flange, it may be fixed by e.g. attaching a nut to each of the anchor rods above the base flange, thus applying tension on the anchor rods.

In an alternative embodiment, the formwork is not removed before casting the second casting layer, i.e. the second casting layer is cast on top of the formwork which provides a groove in the concrete element.

To facilitate arrangement of the formwork in engagement with the anchor rods and/or to facilitate handling of formwork, the formwork may be made from a plurality of segments. The number of segments may e.g. depend on the size of the tower construction, the diameter of the tower construction, the length of the transport route for the formwork, the weight of the formwork, etc. Thus, a formwork may as an example comprise from 1 to 100 or even more segments.

At least one of the segments may be moulded in one piece. However, the segments may alternatively be made from two or more parts being assembled to form a segment.

The formwork may be made from foam or rubber as these materials may decrease the weight of the formwork and therefore facilitate handling hereof. As an example, the material may be PE (Polyethylene). However, other materials, such as metal may also be used.

One advantage of using a formwork made from foam, rubber, or a similar material is that the formwork may be easily removed after the concrete has gained sufficient strength to be self-supporting. This is due to the fact, that the formwork may be removed by use of a shovel or similar tools which are available at the construction site. The construction workers may remove the formwork by digging it away and thus destroy it. Reuse of the formwork at another construction site may therefore not be possible.

To facilitate arrangement of the formwork in engagement with the anchor rods, the formwork may comprise holes wherein the anchor rods can be received. The formwork may thus be positioned on top of the upwardly projecting anchor rods, the rods may be received in the holes, and the formwork may be pushed downwardly until the correct position is obtained. If the formwork comprises segments, the segments may be positioned one by one.

To facilitate engagement between the formwork and the anchor rods, the formwork may be made such that it requires elastic deformation of the holes for the anchor rods to be received therein, i.e. the holes may be made in undersize relative to the diameter of the anchor rods. This further has the advantage, that the holes are self-sealing so that the liquid concrete does not penetrate to the other side of the formwork through the holes. As an example, the anchor rods may have a diameter of 36 mm, whereas the holes may have a diameter of 32 mm. It should however be understood, that the hole may have continuously decreasing or stepwise decreasing diameter in the direction of the material thickness of the formwork (thickness direction).

Thus, the step of arranging the formwork in engagement with the anchor rods may comprise a step of inserting the anchor rod through holes in the formwork, the holes having smaller diameters than the anchor rods so as to elastically deform when the anchor rods are inserted there through.

If the formwork is to be removed prior to the step of casting the second casing layer, it may be an advantage if the method further comprises a step of coating the formwork to reduce bonding between the formwork and the concrete element prior to the step of casting the concrete element, as this may facilitate removal of the formwork. Alternatively, the material used for the formwork may be chosen so that it, due to the inherent material properties, ensures a sufficiently low degree of bonding between the formwork and the concrete element.

In a second aspect, the invention provides a formwork for use when laying a foundation comprising anchor rods, the formwork being ring-shaped and comprising holes wherein the anchor rods can be received.

It should be understood, that the above-mentioned features of the first aspect of the invention may also be applicable in relation to the formwork for use when laying a foundation according to the second aspect of the invention. Thus, the second aspect may comprise any combination of features and elements of the first aspect of the invention.

Elastic deformation of the holes may be required for the anchor rods to be received therein, whereby engagement between the anchor rods and the formwork may be facilitated.

BRIEF DESCRIPTION OF THE DRAWINGS

Embodiments of the invention will now be further described with reference to the drawings, in which.

DETAILED DESCRIPTION OF THE DRAWINGS

Figure 1:
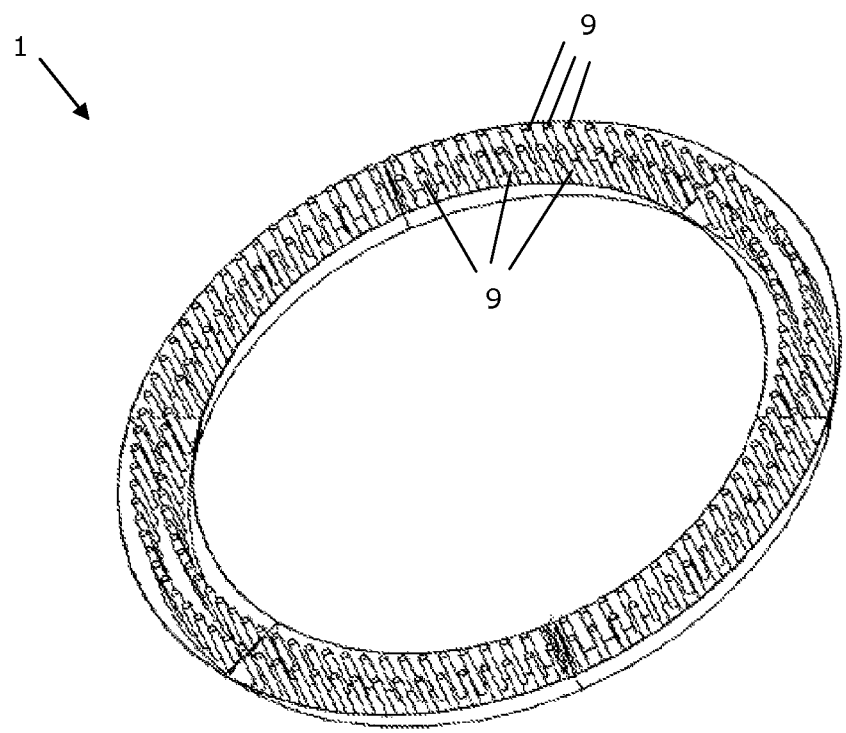
FIG. 1 illustrates an embodiment of a formwork.
Figure 2:
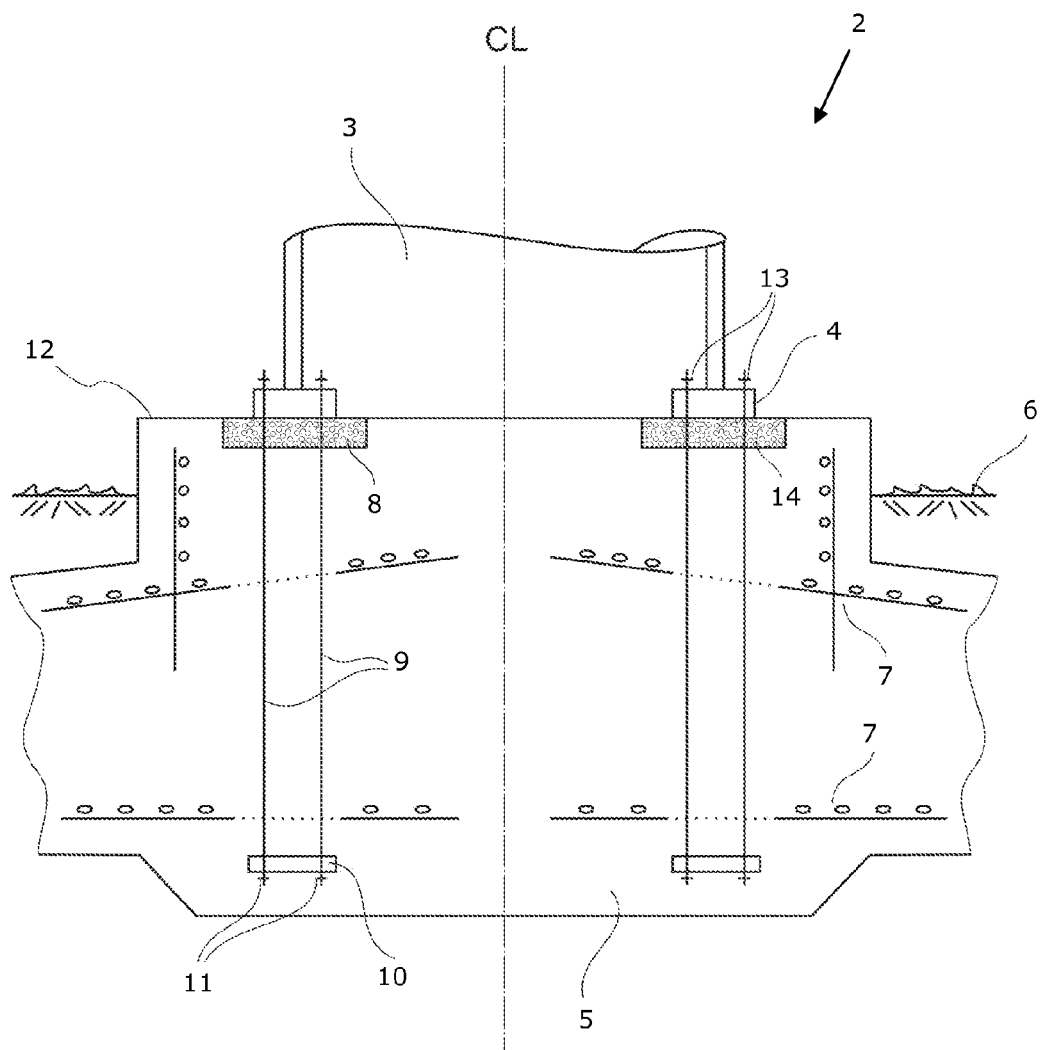
FIG. 2 illustrates an embodiment of a foundation for a tower construction.

FIG. 1 schematically illustrates an embodiment of a formwork 1, the construction of which will be described below. The formwork 1 is to be used when laying a foundation 2 of a tower construction 3 which comprises a base flange 4, as illustrated in FIG. 2. FIG. 2 further illustrates a concrete element 5 for the tower construction 3 being substantially rotational symmetrical about the centre line CL. The concrete element 5 is cast in a pit in the ground 6 and comprises a steel reinforcement 7. The formwork 1 (illustrated in FIG. 1, not shown in FIG. 2) provides a groove 8 in the concrete element 5.

As illustrated in FIG. 2, the concrete element 5 also comprises a plurality of anchor rods 9 and an anchor ring 10. The anchor rods 9 are elongated high strength steel rods being substantially vertical arranged in and spaced about the centre of the concrete element 5. The anchor ring 10 is a steel flange comprising a plurality of through holes which enable connection of the anchor rods 9 to the anchor ring 10. The anchor ring 10 is positioned near the bottom of the concrete element 5, thus the anchor ring 10 is connected to the lower end of the anchor rods 9. The lower part of the anchor rods 9 is threaded and the connection of the anchor rods 9 to the anchor ring 10 is secured by attaching a nut 11 to each of the anchor rods 9 below the anchor ring 10. The upper section of the anchor rods 9 extends through the upper mounting plane 12 of the concrete element 5. The upper section of the anchor rods 9 extending upwardly is also illustrated in FIG. 1 in which they extend through the formwork 1.

The anchor rods 9 are spaced in pairs side-by-side forming two rings about the centre of the concrete element 5, the inner ring of anchor rods 9 having a slightly shorter diameter than the outer ring of anchor rods 9. The anchor ring 10 comprises two sets of through holes spaced about the centre of the anchor ring 10, these through holes forming two rings (see FIGS. 1 and 2).

In order to fix the tower construction 3 to the concrete element 5, the base flange 4 comprises a plurality of through holes. Thus, when positioning a tower construction 3, the anchor rods 9 extend through these holes. The upper part of the anchor rods 9 is threaded allowing for attachment of a nut 13 thereto. Subsequent to positioning the tower construction 3, it is fixed by attaching the nuts 13 to the anchor rods 9 above the base flange 4, thereby applying tension on the anchor rods 9.

The anchor rods 9 may comprise a surface treatment (not shown) which allows for tensioning the anchor rods 9 with substantially no frictional forces affecting the concrete element 5. The surface treatment is a coating allowing the anchor rods 9 to stretch under tension essentially without interacting with the concrete element 5. Alternatively, at least some of the anchor rods may be covered by a hollow plastic tube to avoid interaction between the concrete element 5 and the anchor rods 9.

A second casting layer 14 is located between the concrete element 5 and the base flange 4. This second casting layer 14 is provided to distribute pressure to the concrete element 5. The second casting layer 14 is cast in the groove 8 which is provided by the ring-shaped formwork 1.

As mentioned above, the formwork 1 is shown schematically in the figures. It's actual construction may vary, but one aspect of the design is that it engages the anchor rods 9. Thus, when arranging the formwork 1 in engagement with the anchor rods 9, the formwork 1 is attached to the anchor rods 9 so that the anchor rods 9 support and carry the formwork 1 (see FIGS. 1 and 3). In the illustrated embodiment, the formwork 1 is arranged in engagement with the anchor rods 9 by use of frictional forces such that separate fixing structures are not required.

To facilitate engagement between the formwork 1 and the anchor rods 9, the formwork is made such that it requires elastic deformation of the holes 15 (see FIGS. 5 and 6) for the anchor rods 9 to be received therein, i.e. the holes 15 are made in undersize relative to the diameter of the anchor rods 9. This further has the advantage, that the holes 15 are self-sealing so that the liquid concrete does not penetrate to the other side of the formwork 1 through the holes 15. To facilitate elastic deformation of the holes 15, the formwork 1 may be made from foam or rubber. This further has the advantage that the weight of the formwork 1 can be kept down e.g. compared to a formwork made from steel.

Figure 3:
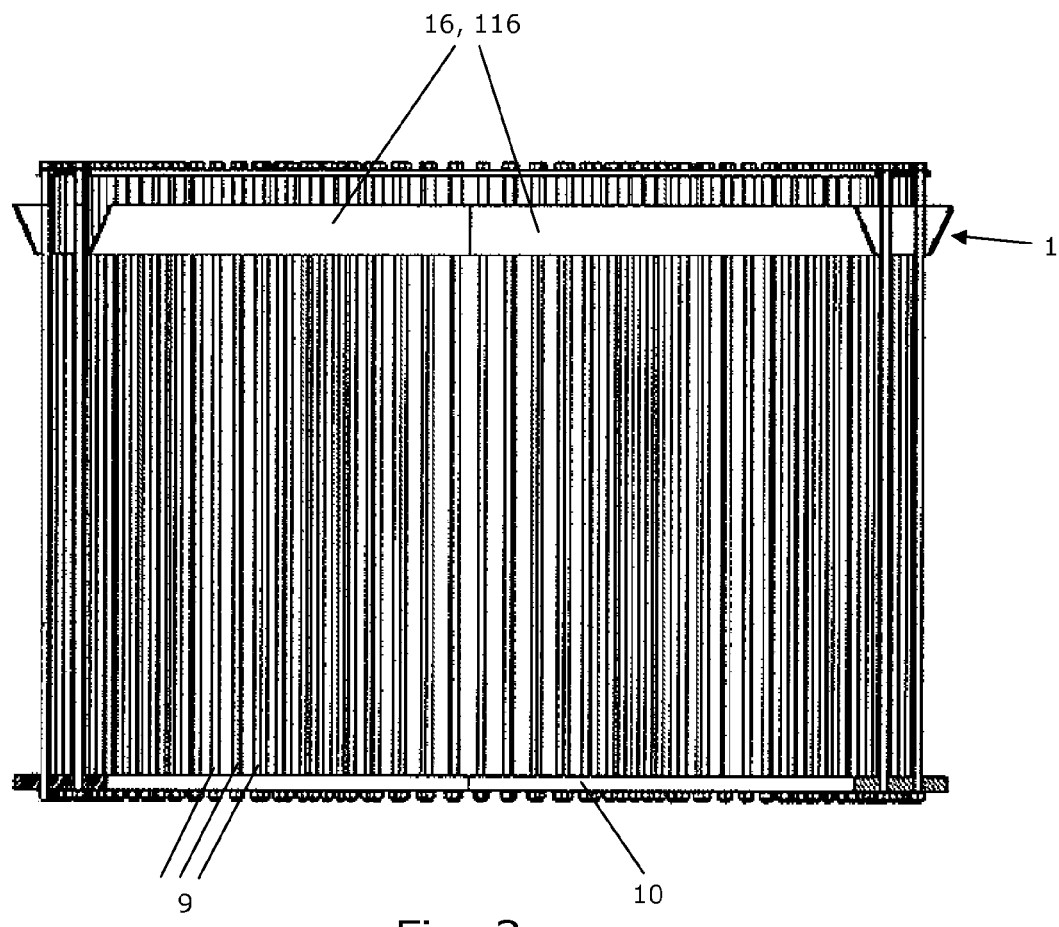
FIG. 3 illustrates an embodiment of a formwork in engagement with a plurality of anchor rods.
Figure 4:
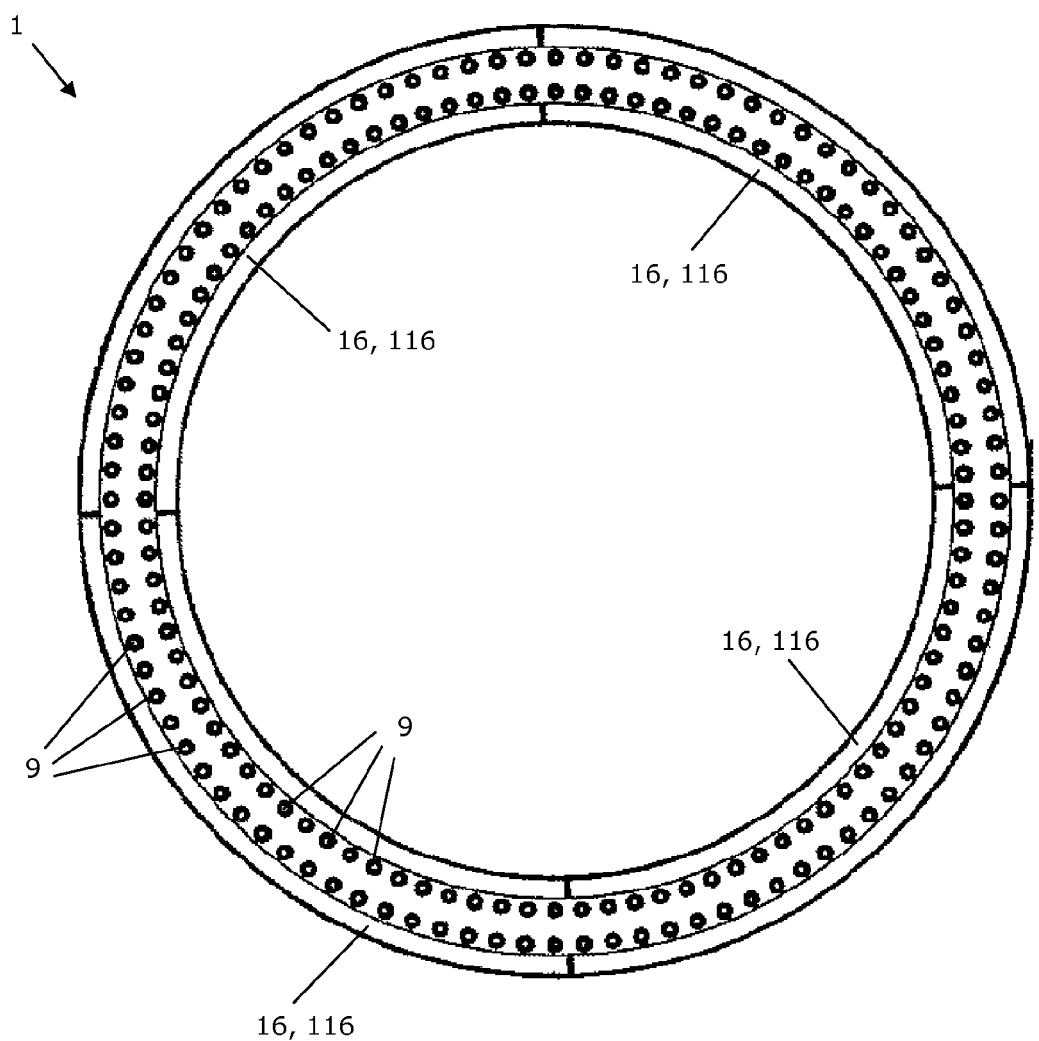
FIG. 4 illustrates the embodiment of FIG. 3 seen from above.

FIG. 3 illustrates an embodiment of a formwork 1 in engagement with a plurality of anchor rods 9. The anchor rods 9 are further connected to the anchor ring 10. FIG. 4 is a view of the illustration of FIG. 3 from above.

After having arranged the anchor rods 9 and the formwork 1, the concrete element 5 can be cast in the pit in the ground 6. To this end, a first casting layer is cast within the pit and around the formwork 1 to form the concrete element 5. The anchor rods 9 may thus act as a reinforcement of the concrete element 5 together with the reinforcement 7 (see FIG. 2).

As illustrated in FIGS. 3, 4, 5, 6, the formwork 1 may be made from a plurality of segments 16, 116. The number of segments 16, 116 may e.g. depend on the size of the tower construction 3, the diameter of the tower construction 3, the length of the transport route for the formwork, the weight of the formwork 1, etc. In the embodiment of FIGS. 3 and 4, the formwork 1 comprises 4 segments, 16, 116.

Figure 5:
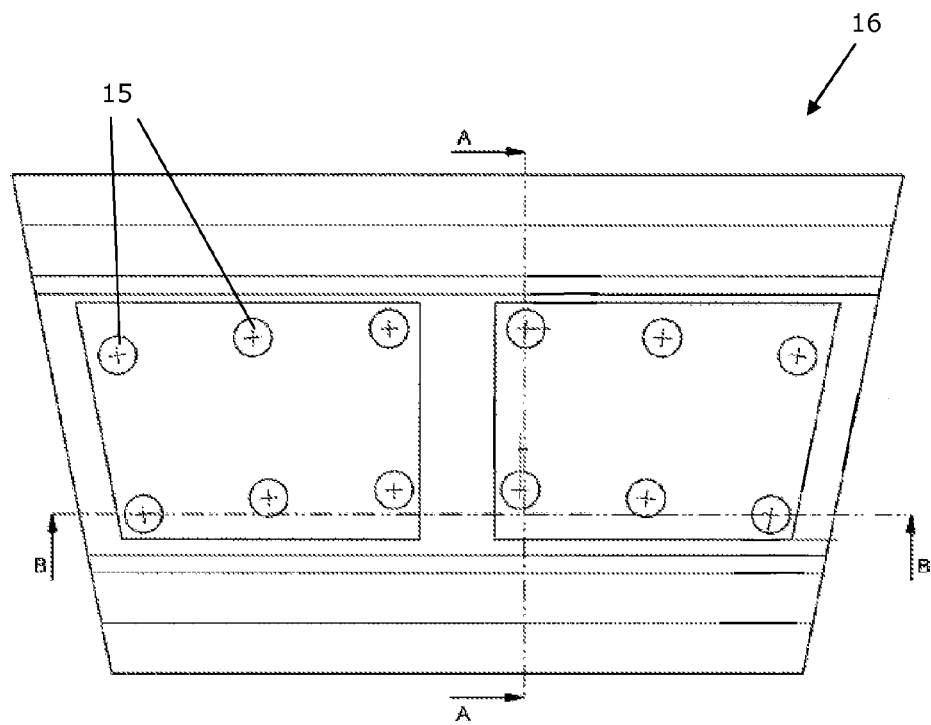
FIG. 5 illustrates an embodiment of a segment of a formwork.
Figure 5A:
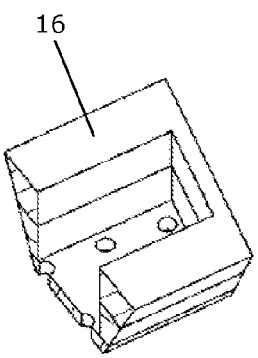
FIG. 5A is a perspective view of the embodiment of FIG. 5 taken along line A-A.
Figure 5B:
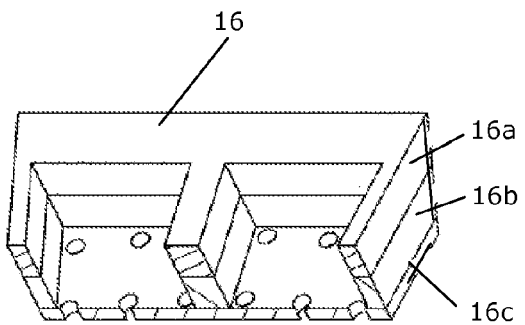
FIG. 5B is a perspective view of the embodiment of FIG. 5 taken along line B-B.

In FIGS. 5-5B, the illustrated embodiment of the segment 16 is made of three different pieces; a top part 16a, a centre part 16b, and a bottom part 16c. In alternative embodiments, the segments may be cast in one piece. The illustrated embodiment 16 comprises 12 through holes 15 for engagement with the anchor bolts 9. The number of through holes 15 depends on the size of the tower construction and the number of segments 16.

Figure 6A:
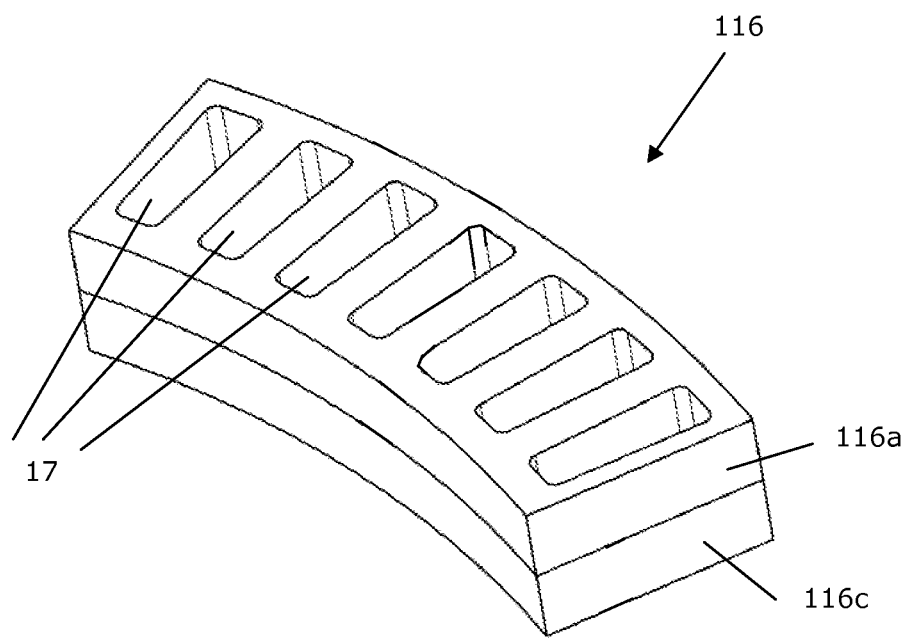
FIG. 6A illustrates an alternative embodiment of a segment of a formwork.
Figure 6B:
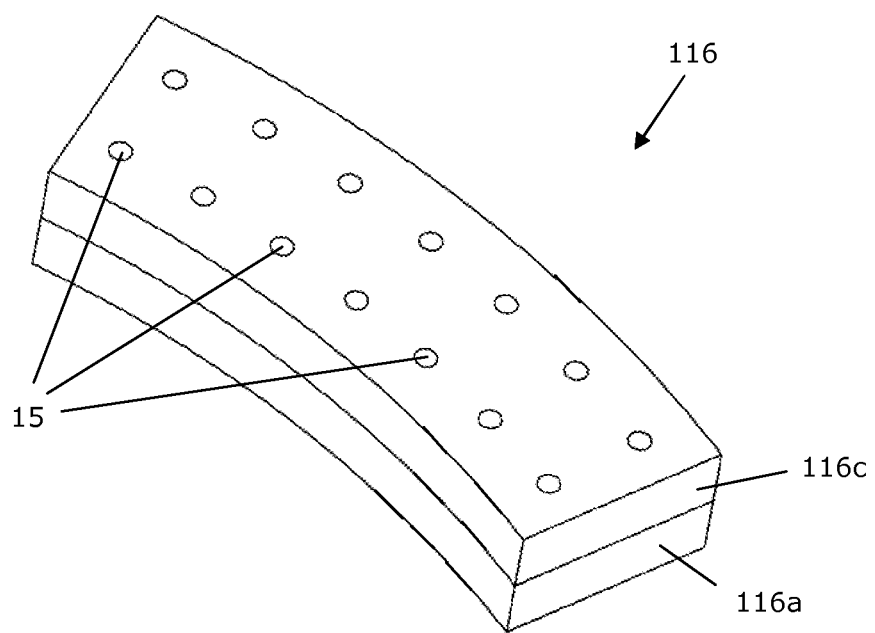
FIG. 6B is a bottom view of the segment of FIG. 6A.

FIGS. 6A and 6B illustrate an alternative embodiment of a segment 116. FIG. 6A is a top view of the segment 116, whereas FIG. 6B illustrates the segment 116 from below. The illustrated embodiment 116 is made of two different pieces; a top part 116*a*, and a bottom part 116*c*. The segment 116 comprises 14 through holes 15 for engagement with the anchor bolts 9. The through holes 15 are spaced in pairs, side-by-side forming two rings about the centre of the concrete element 5. In the illustrated embodiment 116, each pair of through holes 15 is positioned in a recess 17 in the formwork 116.

The invention claimed is:

1. A method of laying a foundation of a tower construction which comprises a base flange, comprising:
   providing a number of anchor rods,
   providing a ring-shaped formwork,
   arranging the anchor rods in a pit in the ground,
   arranging the formwork in engagement with the anchor rods so as to be supported thereby, wherein the formwork is supported on the anchor rods through friction,
   casting a concrete element, wherein the formwork provides a groove in the concrete element,
   casting a second casting layer in the groove in the concrete element,
   lowering the base flange onto the second casting layer, and fixing the base flange to the concrete element.

2. The method according to claim 1, wherein the formwork is removed before casting the second casting layer.

3. The method according to claim 1, wherein the formwork is made from a plurality of segments.

4. The method according to claim 3, wherein at least one of the segments is moulded in one piece.

5. The method according to claim 1, wherein the formwork is made from foam or rubber.

6. The method according to claim 1, wherein arranging the formwork in engagement with the anchor rods comprises a step of:
   inserting the anchor rod through holes in the formwork, the holes having smaller diameters than the anchor rods so as to elastically deform when the anchor rods are inserted there through.

7. The method according to claim 1, further comprising coating the formwork to reduce bonding between the formwork and the concrete element prior to the step of casting the concrete element.

8. An assembly for laying a foundation, the assembly comprising:
   a plurality of anchor rods positioned in a pit in the ground; and
   a formwork supported on the anchor rods, the formwork comprising a ring-shaped member having a plurality of holes extending through the ring-shaped member;
   wherein the anchor rods are received through and frictionally engaged by the holes so as to support the formwork on the anchor rods; and
   wherein the formwork is slidably adjustable in a longitudinal direction along the anchor rods so as to adjust the height of the formwork on the anchor rods.

9. The assembly according to claim 8, wherein elastic deformation of the holes is required for the anchor rods to be received therein.

10. The assembly according to claim 8, wherein the formwork is made from foam or rubber.

11. The assembly according to claim 8, wherein the formwork is formed from a plurality of segments.

12. The assembly according to claim 11, wherein at least one of the segments includes a top part, a centre part, and a bottom part, wherein the bottom part includes the holes.

13. The assembly according to claim 11, wherein at least one of the segments includes a top part and a bottom part, the bottom part including the holes and the top part having recesses, each recess being open to a pair of holes in the bottom part.

14. The assembly according to claim 8, wherein elastic deformation of the holes occurs in a generally radial direction when the anchor rods are received therein.

15. The assembly according to claim 8, wherein elastic deformation of the holes occurs in a generally radial direction along an entire circumference of the hole when the anchor rods are received therein.

16. The assembly according to claim 8, wherein the formwork is slidably adjustable in first and second longitudinal directions along the anchor rods so as to adjust the height of the formwork on the anchor rods, wherein the first longitudinal direction is generally opposite to the second longitudinal direction.

17. The assembly according to claim 8, wherein the holes are self-sealing.

18. The assembly according to claim 8, wherein the formwork is supported on the anchor rods without separate fixing structures.

* * * * *